Oct. 16, 1934.  F. F. CHANDLER  1,976,983
BALL AND SOCKET JOINT
Filed Dec. 11, 1933
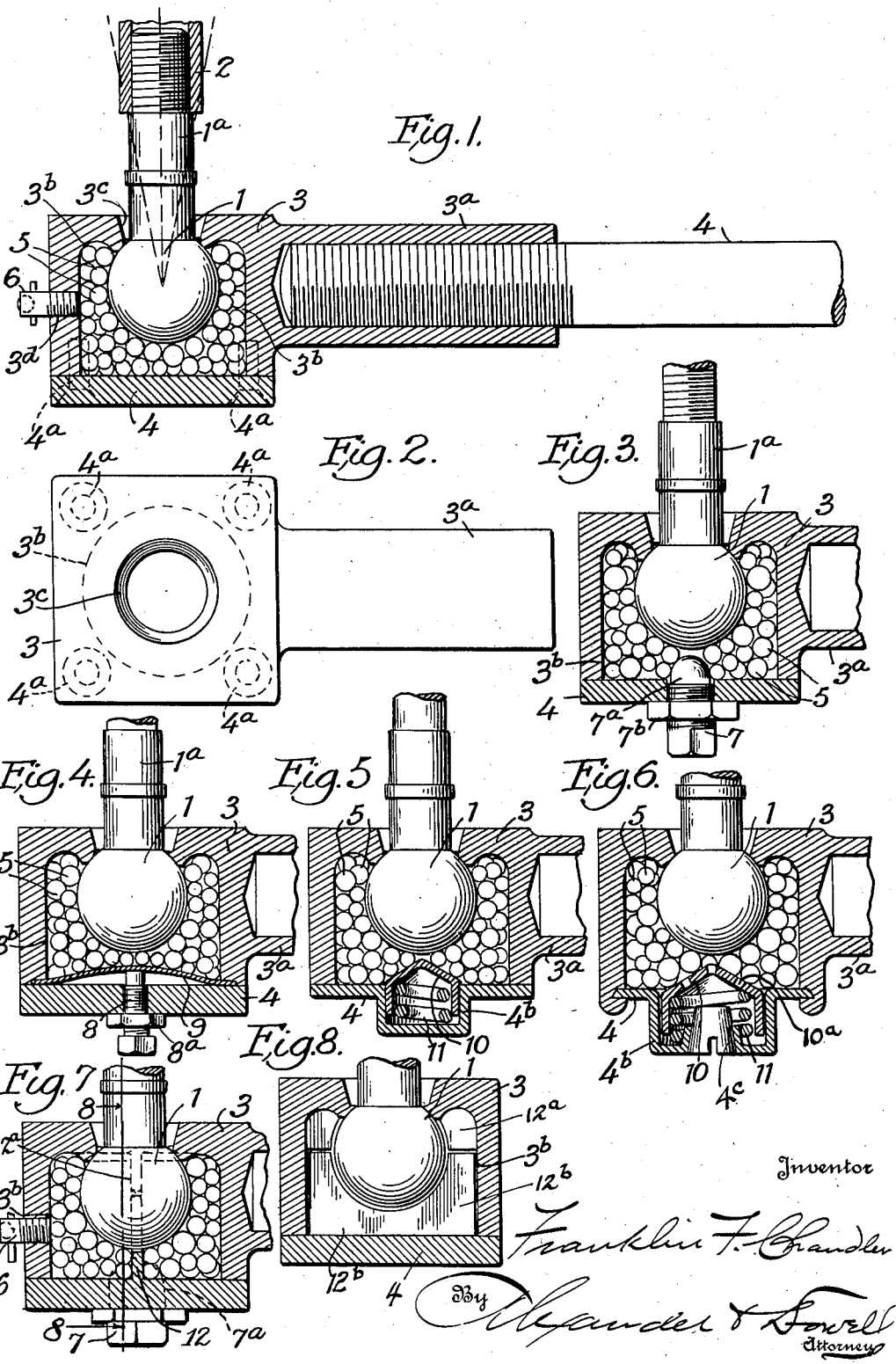

Patented Oct. 16, 1934

1,976,983

UNITED STATES PATENT OFFICE 1,976,983

BALL AND SOCKET JOINT

Franklin F. Chandler, La Fayette, Ind., assignor to Ross Gear & Tool Company, La Fayette, Ind., a corporation of Indiana Application December 11, 1933, Serial No. 701,895

13 Claims. (Cl. 287—90)

This invention is a novel improvement in ball and socket joints, and while particularly adapted for steering rod couplings, is adapted for use in other connections also. The principal object of the invention is to provide a ball and socket joint in which the socket for the ball head is relatively large and of indefinite form with respect to the size of the ball head, the bearing for the ball head in said socket comprising a mobile mass of balls or spherical objects of the same or different sizes, the balls being preferably of hard iron or steel of spherical or nearly spherical form, said mobile mass of balls contacting the ball head on all sides within the socket and forming a bearing for the ball head in all its relative or universal adjustments and maintaining the head in proper position in the socket, and the spaces between the balls being preferably filled with lubricant and insuring ample and good lubrication of the joint.

In such an assembly the balls which contact with the ball head of the joint may or may not rotate, but the large number of balls contacting with all parts of the head will form a bearing surface similar to that provided by so-called "needle bearings", and in this manner provide an unusually good opportunity for lubricant to reach needed spots, and such bearings will operate for longer periods without oiling and are superior to the ordinary ball and socket joints.

Further objects of the invention are to provide means whereby the mass of balls or slugs may be held and adjusted into close contact with the ball head while still permitting the head to rotate or oscillate in assuming its various angular adjustments with respect to the socket; subsidiary objects are to provide means for yieldingly holding the mass of balls in close contact and to provide means for separating the balls in the socket into two or more masses or assemblies, and to prevent shifting of balls from one side of the head to the other side by oscillating or rotating movement of the head. Other minor objects of the invention will be hereinafter set forth.

I will explain the invention with reference to the accompanying drawing which illustrates several practical embodiments thereof to enable others familiar with the art to adopt and use the same; and will summarize in the claims the novel features of construction, and novel combinations of parts, for which protection is desired.

In said drawing:—

Fig. 1 is a longitudinal section through one form of ball and socket joint embodying my invention.

Fig. 2 is a top plan view of the socket member of the joint detached, with the ball head removed.

Fig. 3 is a longitudinal section, similar to Fig. 1, showing one means for adjusting the pressure of the mobile mass of balls in the socket on the head.

Figs. 4, 5 and 6 are sectional views, similar to Fig. 3, showing modified forms of the pressure adjusting means.

Fig. 7 is a section similar to Fig. 3 showing means for dividing the mobile mass of balls in the socket.

Fig. 8 is a section on the line 8—8, Fig. 7.

As shown in Figs. 1 and 2, the ball head 1 has a tubular shank 1a which may be threaded, welded or otherwise secured onto the end of a tie rod arm or drag link arm 2; or to any other member to be connected by a ball and socket joint. The socket member 3 may be cast, stamped steel, or forged and is shown as provided with a tubular shank portion 3a adapted to be threaded or otherwise secured onto the end of a tie rod tube or drag link tube or rod 4. The shank 3a may be welded or fixed to the tube or rod 4 but is preferably threaded thereon so that the socket 3 will be adjustable with respect to rod 4. The socket member however may be connected with or formed on any member to be connected by a ball and socket joint.

Socket member 3 has a socket or recess 3b having a reduced circular opening 3c of less diameter than the head 1. The socket 3b is materially larger than the ball head 1, but need not have any particularly definite form. The socket member has an opening closed by a removable cover plate 4 which may be held in position by screws or other suitable means 4a. After the ball head 1 is inserted in the socket the recess 3b is completely filled with a mobile mass of spherical or nearly spherical balls of hard metal which balls may be of the same or of various different diameters.

While balls or slugs of the same diameter may be used I prefer to use balls or slugs of different or varying diameters as they produce a more mobile mass or assembly. The mass of balls act like a fluid, and a large number of balls will come into close bearing contact with all the surfaces of the ball head 1 within the socket. The balls which do not contact with ball head 1 form an anti-friction packing for those which do contact, tnd the ball head 1 is held in accurate position in the socket.

The socket member has an opening 3d in the socket 3b for introducing lubricant into the mass of balls. This opening may be provided in any convenient location and an alemite nipple 6 may be connected therewith. When such lubricant is introduced the large number of spaces between the balls 5 forms a lubricant reservoir, so that should periodical lubrication be neglected the reservoir will act to supply lubricant to the points of contact.

Obviously in my assembly the ball head 1 may be either rotated about its axis, or may be pivoted or swung so that its axis is angularly disposed with respect to the axis of rod 4; or both can occur and the small balls 5 will still make proper contact with head 1.

As shown in Fig. 3 an adjusting screw 7 may be tapped into the cover plate 4, or other part of the socket member, its inner end 7a entering the mobile assembly of balls 5. This provides a mechanical adjustment which because of the mobility of the ball assembly will force some of the balls into closer contact with the ball head 1, while still permitting the ball head 1 to rotate or have angular movement. A lock nut 7b may be provided on screw 7.

As shown in Fig. 4 a spring plate 9 is placed in the socket and can be adjusted by a screw 8 to produce closer contact between the balls and ball head 1. If the ball head 1 is not in perfect spherical form the plate 9 will permit a breathing effect in the mobile assembly 5 and maintain close contact of the balls with the head 1 and such breathing effect will move many of the small balls slightly with respect to each other so that lubricant will continually flow from spaces between outer balls to those balls which are in contact with head 1. A lock nut 8a may be provided for screw 8.

Figs. 5 and 6 show other forms of a spring loaded adjustment which in effect are similar to that shown in Fig. 4. In these modifications caps 10 are movably mounted in recesses 4b in the socket or cover plate 4, and springs 11 tend to normally urge the caps 10 into the mobile ball assembly to maintain the balls in close contact with head 1 as above explained with respect to Figs. 3—4. In Fig. 6 the cap 10 is perforated, as at 10a, and the bottom of the recess 4b in the socket is provided with a removable plug 4c for introduction of lubricant into the socket. Other forms of spring loaded adjustments might be used.

In Figs. 7 and 8 a dividing wall 12a, 12b, formed integrally with the casing and cap is placed in the socket recess and divides the mobile balls therein into two separate mobile ball assemblies on opposite sides of the wall. The dividing wall should be solidly attached to the casing so that, if pressure is exerted on the balls in one half of the space, the wall will be sufficiently rigid to prevent the transfer of balls to the other half. I preferably form the upper half of the wall 12a integrally with the casing 3, and the other half 12b integrally with cover 4. These two parts 12a, 12b, when assembled, meet on a line disposed diametrically of ball head 1, as shown in Fig. 7. Such wall construction may be used in connection with the constructions shown in Figs. 1 to 6. Similarly, another dividing wall may be used, placed at an angle of ninety degrees to the wall 12a, 12b for the purpose of making four ball pockets if desired.

While my invention is illustrated in connection with ball and socket rod joints of the right angle type, obviously it may be employed for pipe joints, bearings, and other mechanisms wherein such ball and socket joints would be useful.

I claim:—

1. A ball and socket joint, comprising a member having a ball head, a socket member having a recess to receive the ball head and an opening at one side of the recess through which the said member extends, and a mass of relatively movable balls filling the recess and surrounding the head on all sides except at the said opening, the average space between the ball head and the walls of the recess being of greater width than the average diameter of the balls.

2. In a ball and socket joint as set forth in claim 1, said mass including balls of different sizes.

3. In a combination as set forth in claim 1, means in said recess dividing the mobile mass of balls therein.

4. In a ball and socket joint as set forth in claim 1, means for yieldably holding the mobile mass of balls in contact with the ball head.

5. In a ball and socket joint as set forth in claim 1, means for adjusting the pressure of the mobile mass of balls on the ball head.

6. In a ball and socket joint, a member having a spherical head, a socket member having a relatively large recess receiving the head, and a reduced opening preventing withdrawal of the head, a mobile mass of relatively movable balls filling the socket and forming a bearing for the head the average space between the ball head and the inner walls of the recess being of greater average width than the average diameter of the balls; and means for forcing the mobile mass into contact with the head.

7. In a ball and socket joint as set forth in claim 6, said means comprising an adjustable member having its inner end entering the mobile mass.

8. In a ball and socket joint as set forth in claim 6, said means comprising a yieldable plate in the socket engaging the mobile mass, and an adjustable member entering the socket and engaging the plate.

9. In a ball and socket joint as set forth in claim 6, said means comprising a member movably mounted in the socket and engaging the mobile mass, and yieldable means for normally urging the member against the mobile mass.

10. In combination, a member having a spherical head, a second member having a relatively large socket receiving the head, and having a reduced entrance to said socket preventing withdrawal of the head therethrough; said socket having a filling opening; a removable cover plate for said opening, a mass of relatively movable balls filling the socket and forming a bearing for the head the average space between the ball head and the inner walls of the recess being of greater average width than the average diameter of the balls; and means for forcing the mass of balls into contact with the head.

11. In a combination as set forth in claim 10, a fixed wall in the socket disposed diametrically of the head dividing the mobile mass.

12. In a combination as set forth in claim 10, said means comprising a screw tapped through the cover plate with its inner end entering the mobile mass.

13. In a combination as set forth in claim 10, said means comprising a screw tapped through the cover plate; and a spring plate in the socket engaging the mobile mass and actuated by the screw.

FRANKLIN F. CHANDLER.